United States Patent [19]

Eckert et al.

[11] 4,211,946

[45] Jul. 8, 1980

[54] ASYNCHRONOUS ELECTRIC MACHINE

[75] Inventors: Joachim Eckert; Franz Spirk, both of Berlin, Fed. Rep. of Germany

[73] Assignee: Siemens Aktiengesellschaft, Berlin and Munich, Fed. Rep. of Germany

[21] Appl. No.: 897,351

[22] Filed: Apr. 18, 1978

[30] Foreign Application Priority Data

Apr. 27, 1977 [DE] Fed. Rep. of Germany ....... 2719326

[51] Int. Cl.² ............................................. H02K 17/20
[52] U.S. Cl. .................................. 310/212; 310/166; 310/211
[58] Field of Search ............... 310/166, 210, 211, 212; 318/830

[56] References Cited

U.S. PATENT DOCUMENTS

| 984,582 | 2/1911 | McCollum | 310/212 |
|---|---|---|---|
| 1,610,506 | 12/1926 | Fletcher | 310/212 |
| 1,708,909 | 4/1929 | Spencer | 310/212 |
| 1,841,122 | 1/1932 | Hoseason | 310/211 |
| 1,870,776 | 8/1932 | Johns | 310/211 |
| 1,870,777 | 8/1932 | Johns | 310/211 |
| 2,372,590 | 3/1945 | Ljunggren et al. | 310/211 |
| 2,436,414 | 2/1948 | Arnemo | 310/212 |
| 2,794,138 | 5/1957 | Dunn, Jr. | 310/211 |
| 3,328,616 | 6/1967 | Ringland | 310/166 |
| 3,509,397 | 4/1970 | Diamant | 310/212 |

*Primary Examiner*—Donovan F. Duggan
*Attorney, Agent, or Firm*—Kenyon & Kenyon

[57] ABSTRACT

In an asynchronous machine including a rotor of solid iron and a squirrel cage winding, the rotor is further provided with closed slots of any cross sectional shape which receive the bars of the squirrel cage winding whose upper edge is spaced from the outer surface of the rotor by a distance which is equal to the depth of penetration a of the eddy currents generated for a given starting voltage and for a slip $s \geq 0.8$.

4 Claims, 1 Drawing Figure

U.S. Patent        Jul. 8, 1980        4,211,946
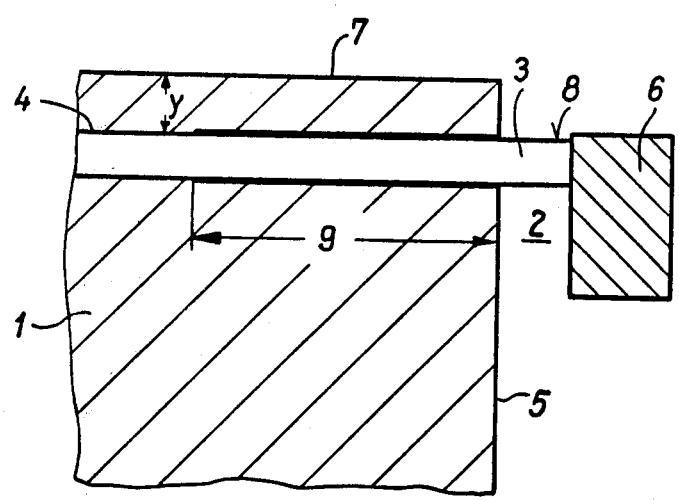

ASYNCHRONOUS ELECTRIC MACHINE

BACKGROUND OF THE INVENTION

1. Field of the Invention

This invention pertains to asynchronous machines and, in particular, to asynchronous machines including a rotor of solid iron and a squirrel cage winding.

2. Description of the Prior Art

In starting a work-performing machine having a high power rating and a high nominal speed, such as, for example, blowers or compressors, use of the nominal starting voltage to asynchronously self-start the main drive motor of the machine may result in an excessively large voltage dip in the network voltage due to the large starting current required. Additionally, the motor may be subject to thermal overload. If, on the other hand, an attempt is made to reduce the nominal starting voltage to the point where the starting current and the voltage dip in the network voltage are permissible, the resultant starting torque may become insufficient to overcome the counter torque and, thus, to bring the machine into operation. It is, therefore, customary to provide such a machine with additional starting devices, such as, for example, starter motors coupled to the main machine or separate starting machine sets. These additional starting devices are expensive, however, and require additional servicing.

Non self-starting asynchronous machines used as generators ae also known wherein, for reasons of mechanical strength, the machines employ high speed solid rotors instead of laminated rotors. Thus, German Offenlegungsschrift No. 25 37 706, discloses such an asynchoronous machine wherein the machine has high power and speed and employs a squirrel cage winding arranged in its solid iron rotor. In this machine, the bars of the squirrel cage winding are arranged in slots which are open toward the outer surface of the rotor. The bars are further designed so that they also form a copper jacket surrounding the surface of the rotor.

It is an object of the present invention to provide an asynchronous machine which when used as a motor which is directly coupled to a high-speed, high power rated work-performing machine, is capable, during asynchronous self-star, of overcoming the countertorque of the latter machine safely without thermal overload and without excessive voltage dips occurring in the network voltage.

SUMMARY OF THE INVENTION

In accordance with the principles of the present invention, the above and other objectives are realized in an asynchronous machine provided with a rotor of solid iron having enclosed slots of any cross sectional shape which receive the bars of a squirrel cage winding whose upper edge is spaced from the outer surface of the rotor by a distance equal to the depth of penetration a of the eddy currents resulting for a given starting voltage and for a slip $s \geq 0.8$. As is known, the magnitude of the aforesaid depth of penetration a of the eddy currents generated in asynchronous starting can be determined for a given terminal voltage at the instant of switching-on, from the Rosenberg formula as follows:

$$a = 1780\sqrt{\frac{p \cdot \hat{H}_2}{s \cdot f_1 \cdot \hat{B}_2}}$$

where
- p = resistivity of the rotor iron in ohm cm
- $\hat{H}_2$ = peak value of the magnetic field strength in kA/cm
- s = slip
- $f_1$ = network frequency is $s^{-1}$
- $\hat{B}_2$ = peak value of the magnetic induction in the rotor iron for the slip s in tesla With an asynchronous machine designed as aforesaid, the machine can provide self-starting at a reduced voltage so that the machine can be connected directly to the network. This ability of the machine to start at a reduced voltage is due to the fact that, at the lower speed ranges, the rotor currents are confined substantially to the layer of solid iron which lies above the squirrel cage winding. This results in a torque which is sufficient to overcome the countertorque of the work-performing machine. More specifically, due to the spacing of the upper edge of the squirrel cage winding from the outer surface of the rotor, the winding contributes appreciably to the formation of the torque only in the vicinity of the nominal slip, since only then are the rotor bars linked with the flux and carry current to an increasing extent. Moreover, the aforesaid spacing results in a magnetic leakage in nominal operation which is sufficiently small to obtain the customary breakdown torque of conventional asynchronous motors and a good power factor. Thus, with the present asynchronous machine, the terminal voltage or starting voltage upon switching-on can be selected low enough so that the dip in the network voltage remains within permissible limits during the asynchronous start, and the motor is nevertheless capable of overcoming the counter-torque safely and without thermal overload.

During asynchronous start, the currents flowing in the solid iron of the rotor of the present machine flow along the surface of the rotor in the axial direction and return in the circumferential direction at the end faces of the rotor. Thus, in the vicinity of the end faces of the rotor, there is a tendency of the currents to pass into the bars of the squirrel cage winding, unless the latter are insulated. This is so because the shorting rings of the squirrel cage winding at the rotor ends constitute a substantially better conducting connection in the circumferential direction than the end face of the solid iron of the rotor. Such passage of current into the rotor bars if the contact between the bars and rotor end face is poor, can, however, cause splattering or local burns. It is, therefore, advantageous to provide the surface of the bars and the surfaces of the rotor slots in the area adjacent the rotor end faces with a contact-improving coating such as, for example, silver-plating. This establishes good contact between the bars of the winding and the iron of the rotor in this area. Alternatively, the avoidance of splattering or burns can also be accomplished by providing insulation for insulating the winding bars from the iron of the rotor. In such case, the insulation must be capable of withstanding high temperatures and pressures.

BRIEF DESCRIPTION OF THE DRAWING

The above and other features and aspects of the present invention will become more apparent upon reading the following detailed description in conjunction with the accompanying drawings wherein the sole drawing shows diagrammatically a partial view of a longitudinal cross section of a rotor of an asynchronous machine in accordance with the principles of the present invention.

DETAILED DESCRIPTION

FIG. 1 shows a rotor 1 of an asynchronous machine which is to be used to drive and is directly coupled to a high-speed work-performing machine of high power rating. The rotor 1 is in the form of a solid member comprised of iron and, in particular, of forged steel. The rotor 1 is further provided with a squirrel cage winding 2 comprised of bars 3 which, preferably, are round. For carrying the bars 3, enclosed axial holes 4 located near the outer circumference of the rotor 1 are provided therein. The bars 3 are further connected to each other at the end faces 5 of the rotor by shorting rings 6.

In accordance with the invention, the distance y between the outer surface of the rotor 7 and the upper edge of the squirrel cage winding 2 is selected so that it is equal to the depth of penetration a of the eddy currents generated for a given terminal voltage during asynchronous starting and for a slip of $s \geq 0.8$ and preferably a slip $s=1.0$. As a result, the rotor currents which flow during such starting are confined substantially to the layer of rotor encompassed by the distance y and, hence, between the upper edge of the winding 2 and the outer surface of the rotor. Only when the nominal slip condition is reached do the bars 3 of the squirrel cage winding 2 carry increasing current and, therefore, contribute to the formation of the torque. In this manner, the asynchronous motor using the rotor has a high starting torque and, therefore, can overcome with little difficulty the torque of the work-performing machine to be driven thereby. In addition, at rated operation, the motor exhibits a good power factor, as the magnetic leakage occurring in the aforesaid layer of the rotor encompassed by the distance y is relatively small.

Advantageously, in the area 9 adjacent to the end faces 5 of the rotor 1, the surfaces of the bars 3 and those of the slots 4 are silver-plated, to ensure good contact between the bars 3 and iron of the rotor. This prevents splattering or local burns in the area 9, which would normally result due to circumferential currents which flow between the bars 3 and the iron of the rotor.

Alternatively, the bars 3 can be insulated from the iron of the rotor in the area 9, whereby such splattering or local burning would also be avoided.

What is claimed is:

1. In an asynchronous machine including a rotor of solid iron and a squirrel cage winding, the improvement comprising:

said rotor having closed slots of any cross-sectional shape enclosed within the iron in which the bars of said squirrel cage winding are arranged, and the upper edge of said squirrel cage winding when said winding is disposed in said slots being spaced from the outer surface of said rotor by a distance which is equal to the depth of penetration of the eddy currents generated for a given starting voltage and for a slip $\geq 0.8$.

2. In an asynchronous machine in accordance with claim 1, the improvement wherein:

said slots have a circular cross sectional shape.

3. In an asynchronous machine is accordance with claim 1, the improvement further comprising:

a contact-improving coating disposed on the surface of said bars and the juxtaposed inside surfaces of said slots in the area adjacent the end faces of said rotor.

4. In an asynchronous machine in accordance with claim 1, the improvement further including:

means for insulating the surfaces of said winding from the inside surface of said rotor in areas adjacent the end faces of said rotor for preventing burning by circumferential currents.

* * * * *